US008473618B2

(12) United States Patent
Spear et al.

(10) Patent No.: US 8,473,618 B2
(45) Date of Patent: Jun. 25, 2013

(54) METHOD AND SYSTEM FOR PROCESSING MULTIPLE COMMUNICATION SESSIONS IN A COMMUNICATION NETWORK

(75) Inventors: Stephen L. Spear, Skokie, IL (US); Suresh Kumar Chintada, Bangalore (IN); P. Sethuramalingam, Bangalore (IN); Subir Saha, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 1257 days.

(21) Appl. No.: 11/533,164

(22) Filed: Sep. 19, 2006

(65) Prior Publication Data

US 2008/0069119 A1    Mar. 20, 2008

(51) Int. Cl.
*G06F 15/16* (2006.01)

(52) U.S. Cl.
USPC ........................................ 709/227; 709/228

(58) Field of Classification Search
USPC .......... 709/220, 223, 225, 238–240, 227–228
See application file for complete search history.

(56) References Cited

U.S. PATENT DOCUMENTS

| | | | |
|---|---|---|---|
| 5,930,700 A * | 7/1999 | Pepper et al. ............... 455/435.3 |
| 6,829,349 B1 * | 12/2004 | Neale et al. ............... 379/265.09 |
| 7,054,918 B2 * | 5/2006 | Polcyn ........................... 709/217 |
| 7,209,966 B2 * | 4/2007 | Schwartz et al. ............. 709/225 |
| 7,212,618 B1 * | 5/2007 | Cooperman et al. ...... 379/142.05 |
| 7,283,829 B2 * | 10/2007 | Christenson et al. .......... 455/461 |
| 7,411,939 B1 * | 8/2008 | Lamb et al. .................... 370/352 |
| 7,978,828 B1 * | 7/2011 | Edamadaka et al. ........ 379/88.13 |
| 8,194,833 B2 * | 6/2012 | Carnazza et al. ......... 379/142.07 |
| 8,285,265 B2 * | 10/2012 | Wisebourt et al. .......... 455/414.1 |
| 2005/0180393 A1 * | 8/2005 | Skubisz ........................ 370/352 |
| 2006/0062369 A1 * | 3/2006 | Kent et al. ................ 379/207.02 |
| 2006/0072726 A1 * | 4/2006 | Klein et al. .............. 379/201.01 |
| 2006/0117264 A1 * | 6/2006 | Beaton et al. .................. 715/751 |
| 2007/0130275 A1 * | 6/2007 | Maresh ......................... 709/207 |
| 2007/0130340 A1 * | 6/2007 | Alperin et al. ................ 709/226 |
| 2007/0165623 A1 * | 7/2007 | Clark et al. ................... 370/389 |
| 2008/0002820 A1 * | 1/2008 | Shtiegman et al. ...... 379/211.02 |
| 2008/0045184 A1 * | 2/2008 | Randall et al. ............. 455/412.2 |

* cited by examiner

*Primary Examiner* — Hussein A. Elchanti
(74) *Attorney, Agent, or Firm* — Steven A. May

(57) ABSTRACT

A method and system for controlling a plurality of sessions corresponding to at least one communication service in a communication network. The method comprises evaluating at least one of a plurality of personalized policies and information related to at least one communication device of a targeted-user. The method further comprises controlling the plurality of sessions in response to evaluating the at least one of the plurality of personalized policies and the information related to the at least one communication device of the targeted-user.

13 Claims, 5 Drawing Sheets

METHOD AND SYSTEM FOR PROCESSING MULTIPLE COMMUNICATION SESSIONS IN A COMMUNICATION NETWORK

FIELD OF INVENTION

The present invention relates generally to a field of communication networks and more specifically, to processing multiple sessions corresponding to one or more communication services in a communication network.

BACKGROUND OF THE INVENTION

In the existing communication system, a user has several means of subscribing to multiple communication services, both voice and non-voice, which are offered by multiple service providers, over multiple accesses. The user might use multiple devices and corresponding identities associated with the devices to access multiple communication services.

In order to manage communication over multiple communication services, the user can publish a user status and a set of preferences corresponding to each communication service on the respective communication server of each service provider. The user status corresponding to a communication service and the set of preferences as specified by the user are checked before initiating a session corresponding to the communication service for the user. The sessions corresponding to a communication service are automatically controlled based on the user status and the set of preferences as specified by the user. In order to manage sessions corresponding to the multiple communication services, the user may need to perform a similar activity for each of the communication services.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
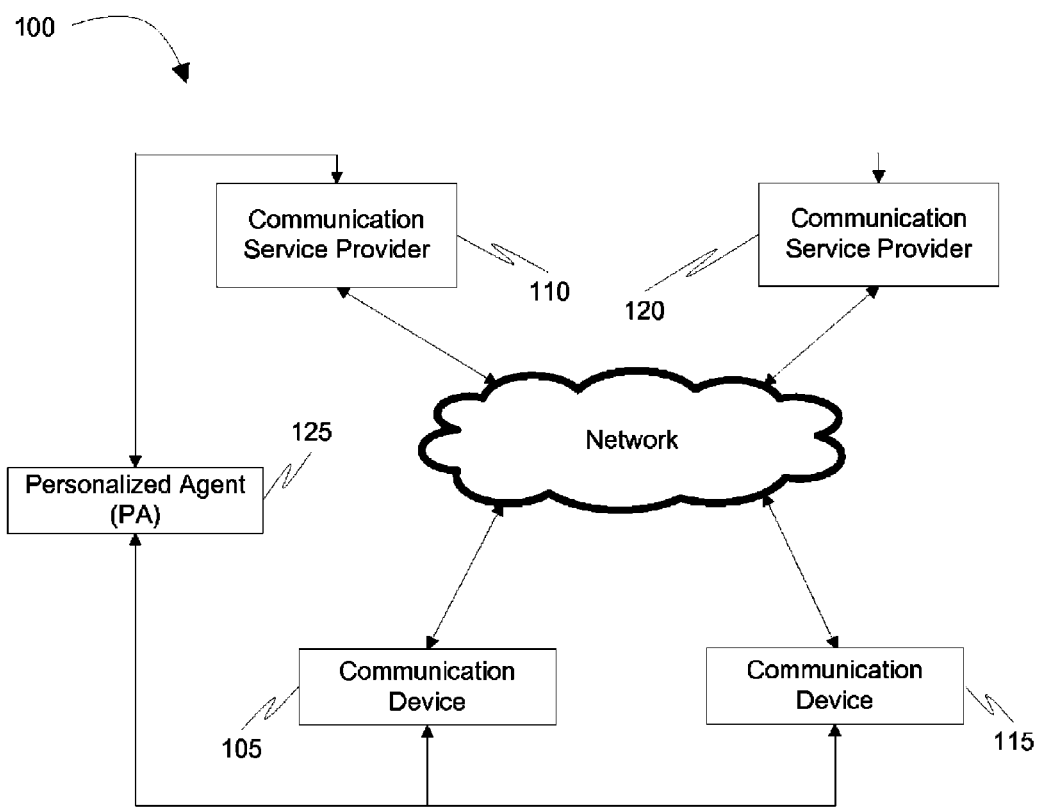
FIG. 1 is a block diagram showing an exemplary environment in which various embodiments of the present invention can function.

Before describing in detail embodiments that are in accordance with the present invention, it should be observed that the embodiments reside primarily in combinations of method steps and apparatus components related to a method and system for processing multiple sessions corresponding to communication service in a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of a method and system for processing multiple sessions corresponding to communication service in a communication network in a defined environment described herein. The non-processor circuits may include, but are not limited to, a radio receiver, a radio transmitter, signal drivers, clock circuits, power source circuits, and user input devices. As such, these functions may be interpreted as steps of a method to provide cordless extension for a plurality of communication devices in a defined environment described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking the various embodiments provide a method and a system for controlling a plurality of sessions corresponding to one or more communication services in a communication network. Embodiments of the present invention provide a method for a user to control sessions corresponding to one or more communication services with the help of a Personalized Agent (PA). The PA is authorized by the user to act on behalf of the user. The PA may be a software agent that is owned and authorized by the user. The PA may act as a centralized entity for all the communication devices being used in an IP network by the user. Those skilled in the art will realize that the above recognized advantages and other advantages described herein are merely exemplary and are not meant to be a complete rendering of all of the advantages of the various embodiments of the present invention.

Referring now to the drawings, and in particular to FIG. 1, a block diagram showing an exemplary communication network 100 in accordance with various embodiments of the invention. It will be appreciated that the communication network 100 may be an IP based network, which enables bringing homogeneity across services, devices and accesses. Those skilled in the art, however, will recognize and appreciate that the specifics of this illustrative example are not specifics of the present invention itself and that the teachings set forth herein are applicable in a variety of alternative implementations. For example, since the teachings described do not depend on the number or type of communication devices and servers, they can be applied to any number or any type of communication devices and service providers although only two communication devices and two communication service providers are shown in this embodiment. For example, a communication device 105 accessing services from a communication service provider 110 and a communication device 115 accessing services from a communication service provider 120 and a Personalized Agent (PA) 125 are depicted in FIG. 1. The communication device 105 and the communication device 115 may comprise a cell phone, a Personal Digital Assistant (PDA), a landline phone, a laptop, or a personal computer. The PA 125 mimics the user using the communication device 105 and the communication device 115 to the communication network 100, the communication service provider 110 and the communication service provider 120. The PA 125 can be potentially implemented on a Residential Gateway, subscriber terminals or on a network server. As such, other alternative implementations are contemplated.

A session corresponding to a communication service is routed through the PA 125 to a communication device. Therefore, each user communication (both inbound and outbound) is routed via a single entity, the user's PA, irrespective of the service provider. Further, the PA 125, being the focal point of all user communication, also becomes a centralized, single point of control for all user communication. As a result, the PA 125 enables a user to have control of the communication using multiple communication devices, independent of the collaboration between the service providers.

Figure 2:
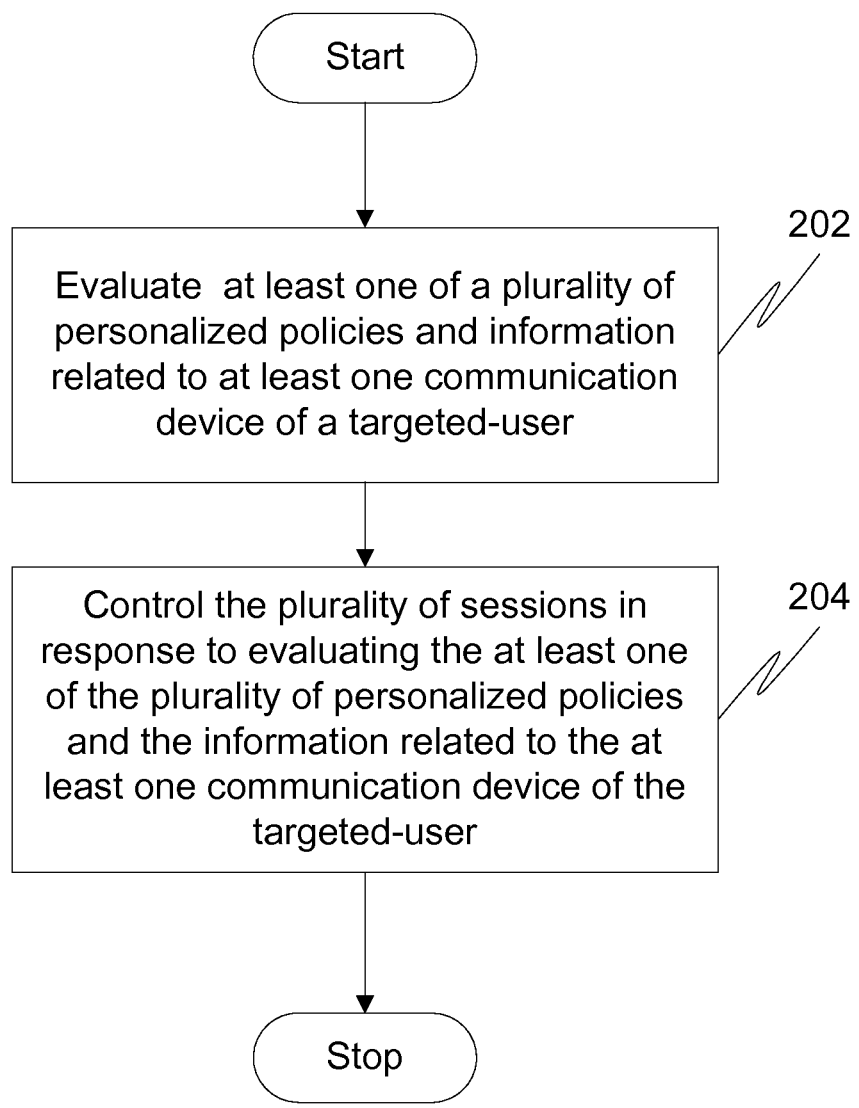
FIG. 2 illustrates a flow diagram of a method for controlling a plurality of sessions corresponding to at least one communication service in a communication network in accordance with an embodiment of the present invention.

Turning now to FIG. 2, a flow diagram for a method for controlling a plurality of sessions corresponding to at least one communication service in a communication network is shown in accordance with an embodiment of the present invention. In the communication network a plurality of sessions are initiated for a targeted-user. The targeted-user can have a plurality of communication devices in the communication network. The communication devices may comprise a cell phone, a Personal Digital Assistant (PDA), a landline phone, a laptop, and/or a personal computer. The targeted-user controls the plurality of sessions by taking a predefined action. The predefined action may be, for example, accepting a session, forwarding a session to a voice mail, rejecting a session or placing a session on hold.

At step 205, upon initiating a session with a targeted-user, a plurality of personalized policies and information related to one or more communication devices of the targeted-user is evaluated. The plurality of personalized policies are specified by the targeted-user for the one or more communication devices for processing the plurality of sessions corresponding to each communication service. Each personalized policy is based on a situation, which is associated with the targeted-user. An example of personalized policy may be: if the targeted-user is not present in office, then each session for the target user is forwarded to a cell phone of the targeted-user. The information related to the one or more communication devices of the targeted-user may comprise an engagement status of each communication device.

At step 210, the plurality of sessions are controlled on the basis of evaluating the plurality of personalized policies and the information related to the one or more communication devices of the targeted-user. If the targeted-user is busy with a session on one of the communication devices, then, any other session request on another communication device is controlled by taking a predefined action. In an embodiment of the present invention, the predefined action may be, for example, forwarding the session to a voice mail, rejecting the session or placing the session on hold.

Figure 3:
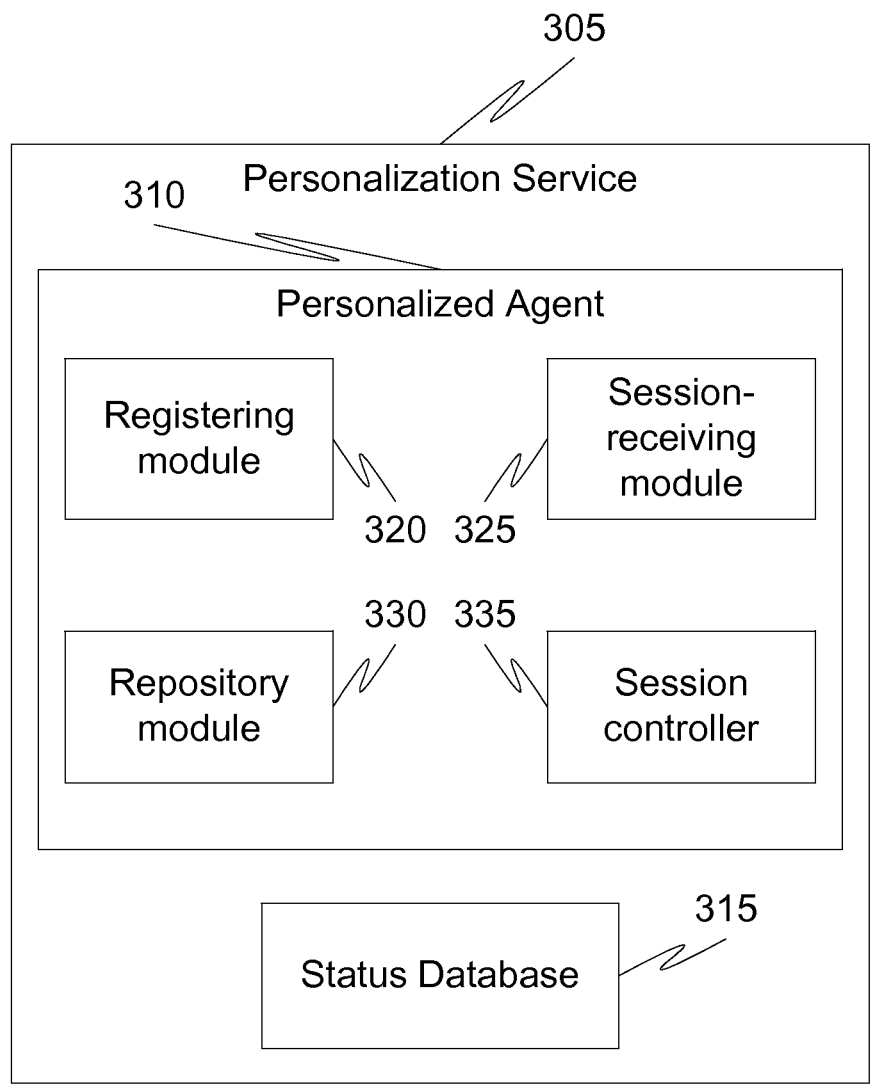
FIG. 3 illustrates a block diagram showing a personalization service apparatus, in accordance with an embodiment of the invention.

FIG. 3 is a block diagram depicting a personalization service apparatus 305 for processing a plurality of sessions corresponding to at least one communication service in a communication network. The personalization service apparatus 305 includes a Personalized Agent (PA) 310 and a status database 315. The status database 315 stores the information related to the one or more communication devices of the targeted-user. The information related to one or more communication devices can be for example, an engagement status of each communication device of the targeted-user.

The PA 310 is authorized by the targeted-user to represent the targeted-user in the communication network. In an embodiment of the present invention, the PA 310 can also be provided by one of the communication service providers in the communication network. The PA 310 mimics the targeted-user using one or more communication devices. In an embodiment of the present invention, the PA 310 is installed on one of the communication devices of the targeted-user. In another embodiment of the present invention, the PA 310 may reside on one of a residential gateway, one or more subscriber terminals and a communication network server.

The PA 310 is configured to control a plurality of session initiation requests corresponding to one or more communication services for the targeted-user. The PA 310 controls the plurality of sessions based on a plurality of personalized policies and the information related to one or more communication devices of the targeted-user. Further, the PA 310 is also configured to select one of the communication services in response to a session initiation received from and originated by the targeted-user. The PA 310 selects one of the communication services using a predefined rule. In an exemplary embodiment of the present invention, the predefined rule may be, for example, comparing a tariff corresponding to each communication service for initiating the session. Further, the session may be initiated using a communication service having a least tariff for establishing the session.

In an embodiment of the present invention, the PA 310 includes a registering module 320, a session-receiving module 325, a repository 330 and a session controller 335. The registering module 320 registers each communication device of the targeted-user to a corresponding communication service. Upon registration, the session-receiving module 325 receives the plurality of sessions corresponding to the one or more communication services. Each session corresponding to each communication service is controlled based on the plurality of personalized policies and the information related to one or more communication devices of the targeted-user. The repository 330 stores the plurality of personalized policies corresponding to one or more communication services. The plurality of personalized policies are specified by the targeted-user for processing the plurality of sessions corresponding to each communication service. A personalized policy is based on a condition, which is associated with the targeted-user. The session controller 335 controls the plurality of sessions received by the session-receiving module 325 based on the plurality of personalized policies stored in the repository 330 and the information related to each communication device stored the status database 315.

Further, as stated earlier, each session corresponding to each communication service initiated for the targeted-user is routed to the PA 315 of the targeted-user. The PA 315 in turn terminates the session to a corresponding communication device based on the plurality of personalized policies and the information related to each communication device of the targeted-user. In an embodiment of the present invention, a session server corresponding to each communication service provider routes a sessions for the targeted-user to the PA 315.

In an embodiment of the present invention, if the PA 315 is unavailable to one or more communication devices of the targeted-user, then a session server corresponding to the each communication service in the communication network routes a session directly to the corresponding communication device of the targeted-user. The PA 315 can be unavailable to one or more communication due to shutdown of the PA 315. Also, the PA 315 can be unavailable to a session sever or a communication device due to a loss of connectivity. In case of unavailability of the PA 315 to one or more communication device, each communication device of the targeted-user re-registers itself with a corresponding communication service, so to avoid any communication loss.

Figure 4:
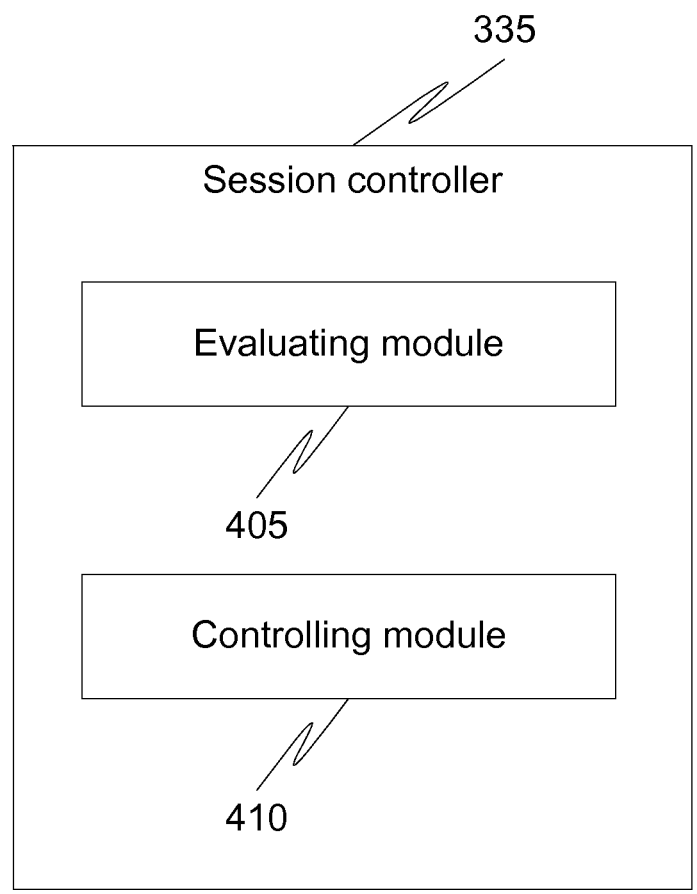
FIG. 4 illustrates is a block diagram showing various modules in a session controller, in accordance with an embodiment of the present invention.

FIG. 4 is a block diagram showing the session controller 335, in accordance with an embodiment of the invention. The session controller 335 comprises an evaluating module 405 and a controlling module 410. The evaluating module 405 evaluates the plurality of personalized policies and the information related to the one or more communication devices of the targeted-user. The controlling module 410 controls the plurality of sessions in response to evaluating the plurality of personalized policies and the information related to the one or more communication devices of the targeted-user.

Figure 5:
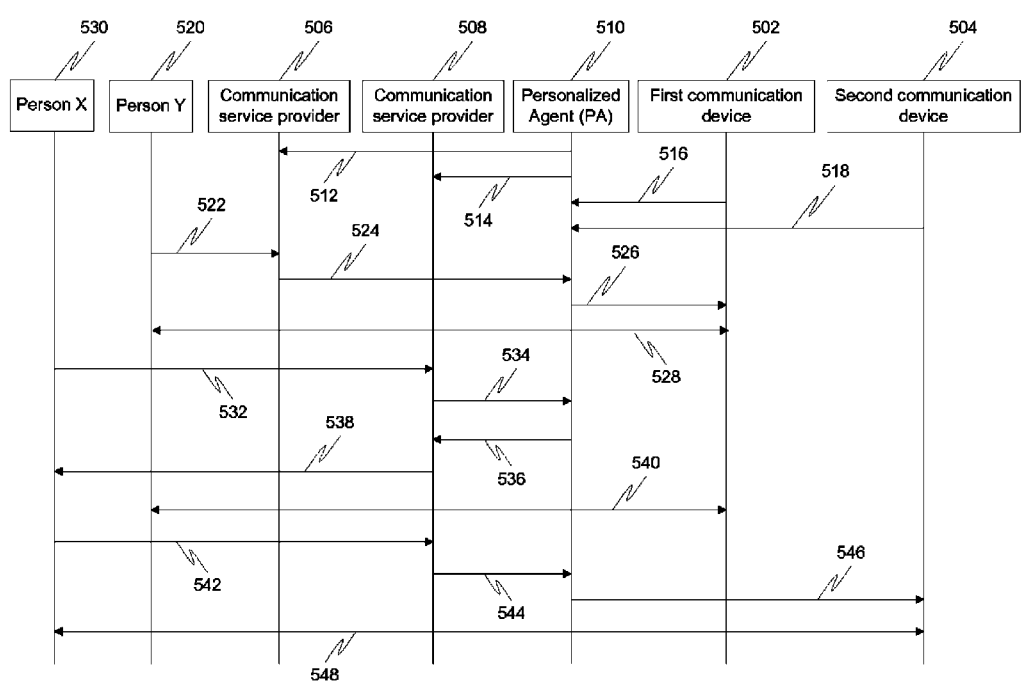
FIG. 5 illustrates an exemplary signaling/messaging flow diagram, in accordance with an exemplary embodiment of the present invention.

Referring now to FIG. 5, an exemplary session control flow diagram is shown in accordance with an exemplary embodiment of the present invention. As depicted in FIG. 5, a targeted-user access communication services using a first communication device 502 and a second communication device 504. The first communication device 502 is used by the targeted-user for a session corresponding to a communication service provided by a communication service provider 506 and the second communication device 504 is used by the targeted-user for a session corresponding to a communication service provided by a communication service provider 508. Those skilled in the art will recognize that the number of communication devices and service providing servers in the communication network is not restricted to two, and the method extends to an arbitrary number of communication devices and service providing servers in the communication network.

A Personalized Agent (PA) 510 is associated with the targeted-user. The PA 510 represents the targeted-user to the communication service provider 506 and the communication service provider 508. Upon start-up, the PA 510 registers itself to the communication service provider 506 and to the communication service provider 508. At step 512, the PA 510 registers itself with the communication service provider 506. Also, the PA 510 gets itself registered with the communication service provider 508 at step 514.

Further, the first communication device 502 registers with the PA 510 at step 516 and second communication device 504 registers with the PA 510 at step 518. A registering module within the PA 510 registers the first communication device 502 and the second communication device 504 with the respective communication service providers.

A person Y 520 initiates a session corresponding to a communication service provided by the communication service provider 506 for the targeted-user on the first communication device 502. The communication service provider 506 routes the session for the targeted-user to the PA 510. The person Y 520 initiates the session with the first communication device 502 by inviting the communication service provider 506 at step 522. The communication service provider 506 in turn invites the PA 510 at step 524. A session-receiving module of the PA 510 receives the plurality of sessions corresponding to one or more communication services. A session controller of the PA 510, control the session based on the plurality of the personalized policies and the information related to each communication device of the targeted-user. At step 526, the PA 510 sends the invite of the session initiated by the person Y 520 to the first communication device 502. At step 530, the session is established between the person Y 520 and the targeted-user on the first communication device 502. The information related to the first communication device 502 is updated as busy in a status database.

In the meantime, a person X 530 initiates a session corresponding to a communication service provided by the communication service provider 508 for the targeted-user on the second communication device 504. The communication service provider 508 routes the session for the targeted-user to the PA 510. The person X 530 initiates the session with the second communication device 504 by inviting the communication service provider 508 at step 532, the communication service provider 508 in turn invites the PA 510 at step 534. Based on the plurality of personalized polices and the information related to the communication devices of the targeted-user, the PA 510 informs the communication service provider 508 about the busy status of the targeted-user at step 536. The communication service provider 508 in turn informs the person X 530 that the targeted-user is busy on another call at step 538. As soon as the session between the person Y 520 and first communication device 502 is terminated, the information related to the first communication device 502 is updated as free in the status database at step 540.

Again, if the person X 530 initiates the session with the second communication device 504 by inviting the communication service provider 508 at step 542. The communication service provider 508 in turn invites the PA 502 at step 544. The PA 502 sends the invite of the session initiated by the person X 530 to the second communication device 504 at step 546. At step 548, the session is established between the person X 530 and the targeted-user on the second communication device 504. The information related to the second communication device 504 is updated as busy in the status database.

The various embodiments of the present invention provide a method and system that controls a plurality of sessions corresponding to one or more communication services in a communication network. Further, the present invention provides a personalized agent (PA) that enables users with better control of their communication options, without the need for collaboration between service providers. The PA acts as a focal point for each communication service utilized by the user. The PA evaluates a plurality of personalized polices as specified by the user and monitors the status of each communication device of the user to process a session corresponding to a communication service for the user.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for a personalized agent to apply user policies to a plurality of communication services, the method comprising:
   registering the personalized agent with a service provider of a first communication service;
   registering the personalized agent with a service provider of a second communication service;
   receiving, at the personalized agent, a session of the first communication service;
   applying, at the personalized agent, a first user policy to the session of the first communication service;
   based, at least in part, on the first user policy, taking a first action with respect to the session of the first communication service, wherein the first communication service is one of a voice service and a non-voice service;
   receiving, at the personalized agent, a session of the second communication service, the second communication service different from the first communication service;
   applying, at the personalized agent, a second user policy to the session of the second communication service, wherein the second communication service is the other of a voice service and a non-voice service and wherein the session of the first communication service and the session of the second communication service involve a same targeted user; and
   based, at least in part, on the second user policy, taking a second action with respect to the session of the second communication service, wherein each of the first action taken and the second action taken is dependent upon whether the communication service is a voice service or a non-voice service.

2. The method of claim 1 wherein the first and second communication services are provided by different service providers.

3. The method of claim 1 further comprising:
   representing, by the personalized agent, a user to the service provider of the first communication service; and
   representing, by the personalized agent, the user to the service provider of the second communication service.

4. The method of claim 1 wherein the session of a first communication service is originated by a user, and wherein the session of the second communication service is directed toward the user.

5. The method of claim 1 wherein applying the first and second user policies involves taking an action selected from the group consisting of: checking an engagement status of a communication device, checking a calendar of a user, and comparing tariffs of a plurality of communications devices.

6. The method of claim 1 wherein the first and second actions are selected from the group consisting of: accepting a session, forwarding a session to voice mail, rejecting a session, placing a session on hold, forwarding a session to a first communication device, forwarding a session to a second communication device different from the first communication device.

7. The method of claim 6 wherein the first communication device is selected from the group consisting of: a mobile telephone, a landline telephone, a personalized digital assistant, a laptop computer, and a personalized computer.

8. The method of claim 1 wherein the first action comprises routing the session of the first communication service to a first communication device associated with the targeted user and the second action comprises routing the session of the second communication service to a second, different communication device associated with the targeted user.

9. The method of claim 1 further comprising registering, by the personalized agent with each of the service provider of the first communication service and the service provider of the second communication service, a communication device associated with the targeted user.

10. A personalized agent for applying user policies to a plurality of communications services, the personalized agent comprising:
    a session-receiving module configured to receive sessions of a plurality of communication services, wherein the sessions involve a same targeted user, wherein a first communication service of the plurality of communication services is a voice service, and wherein a second communication service of the plurality of communication services is a non-voice service;
    a registration module for registering the personalized agent with a service provider of the first communication service and a service provider of the second communication service;
    a repository module configured to store user policies; and
    a session controller module configured to apply user policies to the received sessions and to take actions with respect to the received sessions, the actions based, at least in part, on the applied user policies, wherein the actions taken are dependent upon whether the communication service is a voice service or a non-voice service.

11. The personalized agent of claim 10 wherein the session-receiving module is configured to receive sessions originated by a user and sessions directed toward the user.

12. The personalized agent of claim 10 wherein the first action comprises routing the session of the first communication service to a first communication device associated with the targeted user and the second action comprises routing the session of the second communication service to a second, different communication device associated with the targeted user.

13. The personalized agent of claim 10 wherein the registration module is configured to register a communication device associated with the targeted user with the service providers of the communication services.

* * * * *